Figure 6:
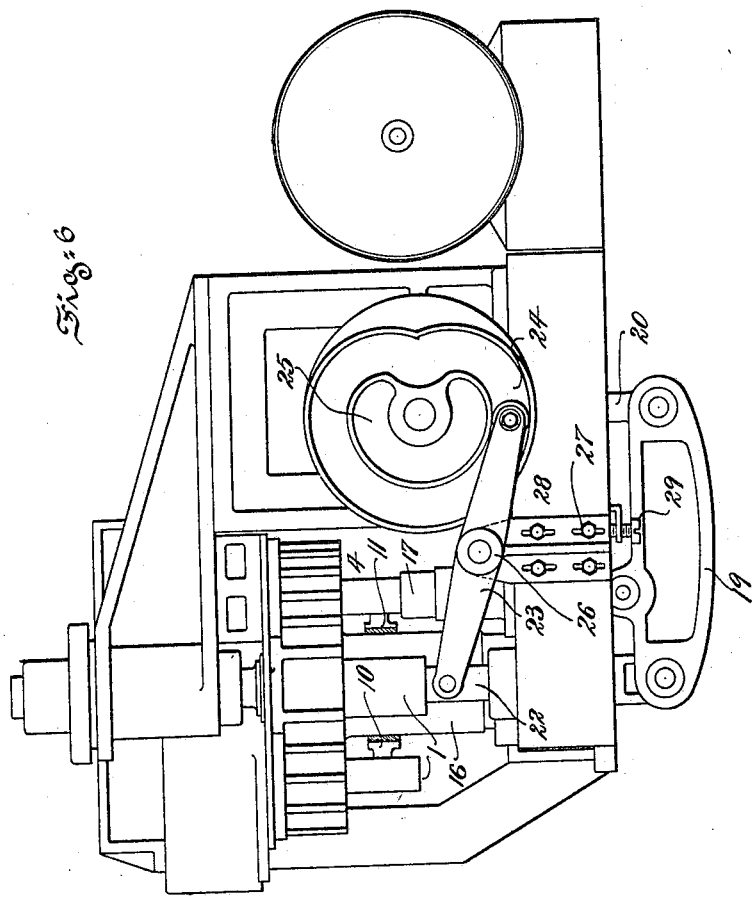

No. 819,781. PATENTED MAY 8, 1906.
H. G. MORRIS.
BRICK MOLDING AND PRESSING MACHINE.
APPLICATION FILED FEB. 7, 1905.
4 SHEETS—SHEET 1.
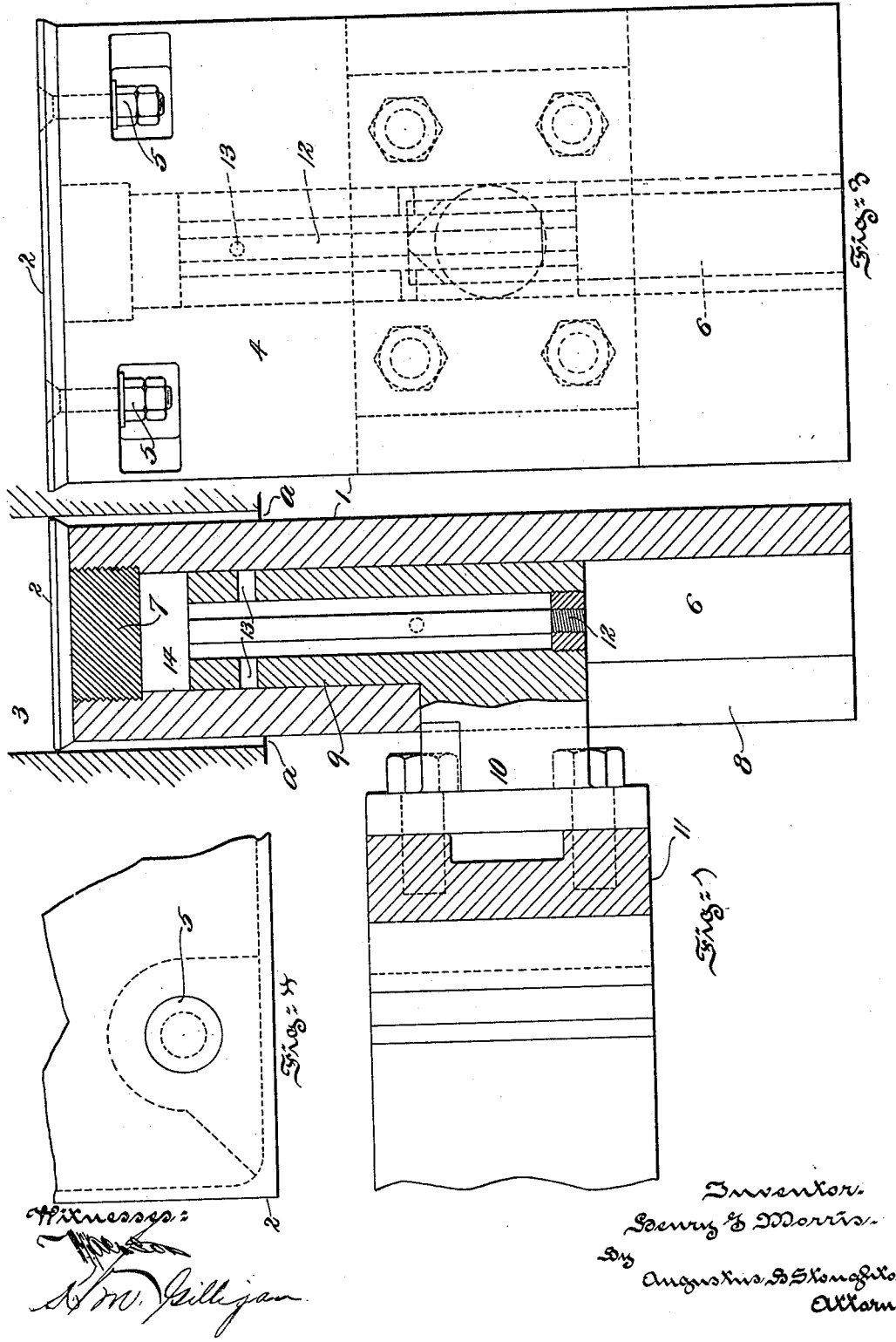

No. 819,781. PATENTED MAY 8, 1906.
H. G. MORRIS.
BRICK MOLDING AND PRESSING MACHINE.
APPLICATION FILED FEB. 7, 1905.
4 SHEETS—SHEET 2.
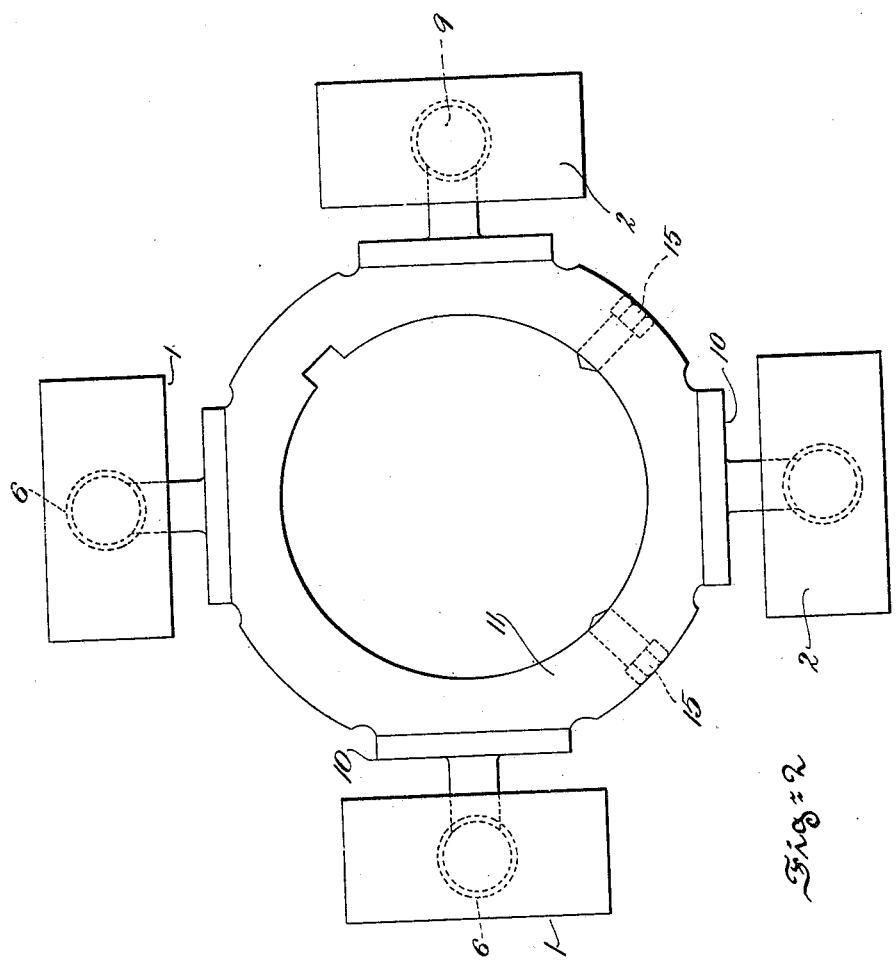

No. 819,781. PATENTED MAY 8, 1906.
H. G. MORRIS.
BRICK MOLDING AND PRESSING MACHINE.
APPLICATION FILED FEB. 7, 1905.
4 SHEETS—SHEET 3.
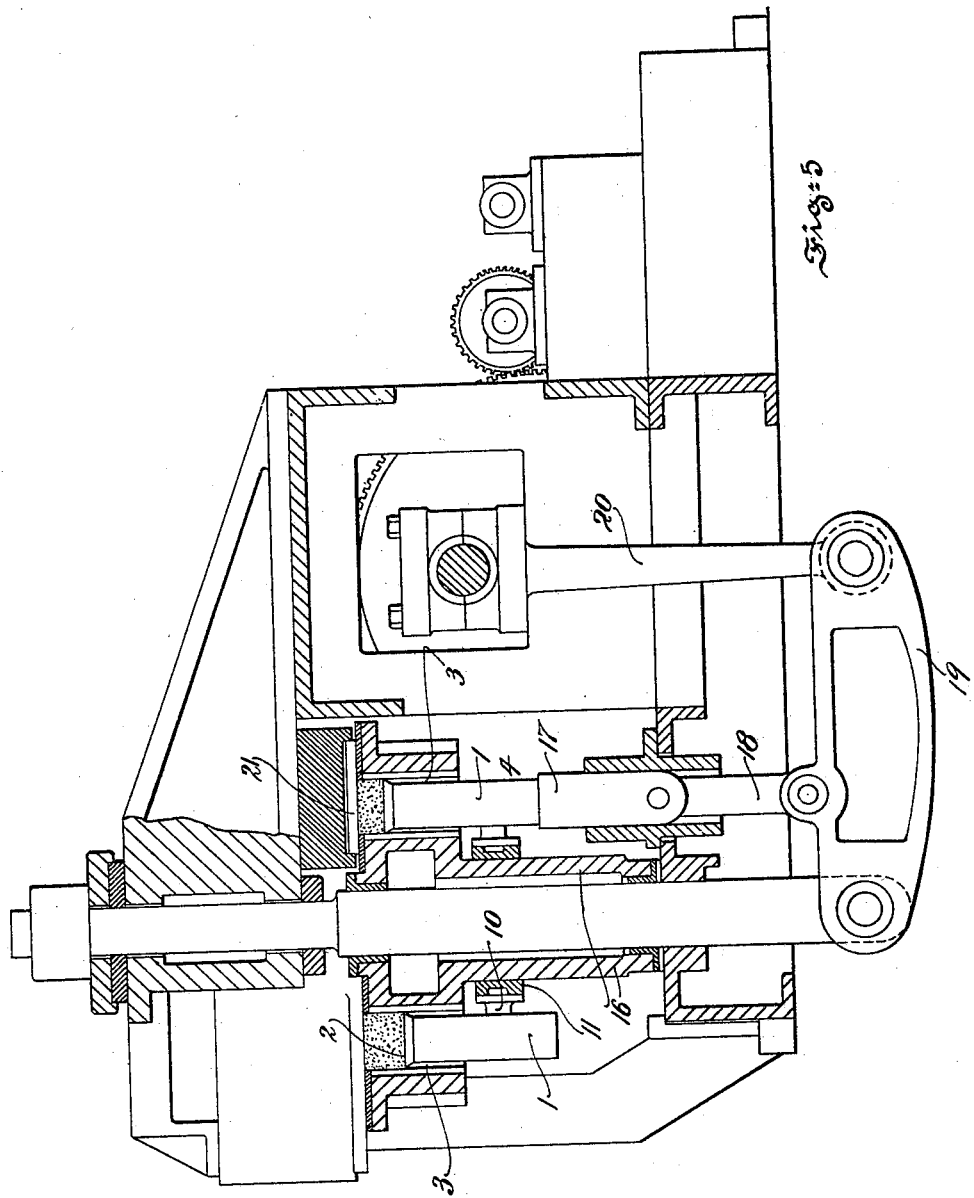

No. 819,781. PATENTED MAY 8, 1906.
H. G. MORRIS.
BRICK MOLDING AND PRESSING MACHINE.
APPLICATION FILED FEB. 7, 1905.

4 SHEETS—SHEET 4.

Witnesses:

Inventor.
Henry G. Morris.
By Augustus B. Stoughton
Attorney

UNITED STATES PATENT OFFICE.

HENRY G. MORRIS, OF PHILADELPHIA, PENNSYLVANIA.

BRICK MOLDING AND PRESSING MACHINE.

No. 819,781.

Specification of Letters Patent.

Patented May 8, 1906.

Application filed February 7, 1905. Serial No. 244,566.

*To all whom it may concern:*

Be it known that I, HENRY G. MORRIS, a citizen of the United States, and a resident of Philadelphia, in the county of Philadelphia and State of Pennsylvania, have invented certain new and useful Improvements in Brick Molding and Pressing Machines, of which the following is a specification.

Objects of the present invention are to protect the surfaces which guide the plungers in respect to the molds from contacting with the material being molded, as well as other material—such as dust, dirt, and the like; to provide for adjusting the drop of the plungers independently of each other; to prolong the life and improve the operation of the machine, and to provide for adjusting the rise of the plungers.

To these and other ends hereinafter set forth the invention comprises the improvements to be presently described and finally claimed.

The nature, characteristic features, and scope of the invention will be more fully understood from the following description, taken in connection with the accompanying drawings, forming part hereof, and in which—

Figure 1 is an elevational view, principally in section, illustrating a plunger and its guide embodying features of the invention. Fig. 2 is a top or plan view of several of the plungers with their guides and supporting ring or collar. Fig. 3 is a front view of one of the plungers. Fig. 4 is a top or plan view of one corner of the top plate or part of the plunger. Fig. 5 is an elevational view, principally in section, illustrating a brick molding and pressing machine and embodying features of the invention; and Fig. 6 is an elevational view illustrating means for elevating the plungers which embody features of the invention.

In the drawings the plunger 1 is provided with a top part or plate 2, which is fitted so as to work freely in the opening 3, which constitutes the mold. The shank 4 of the plunger is of less cross-sectional area than the top or plate 2, or, in other words, is of reduced size, so that any material which passes between the edges of the top part or plate 2 and the walls of the opening 3 is permitted to fall entirely free of the plunger. As shown, the top part or plate 2 is made in a separate piece and bolted to the top of the shank of the plunger by bolts 5, whose heads are accommodated in suitable recesses provided in the shank. The top part or plate 2 is rectangular and comparatively thin, so that it is in no sense guided by the walls of the opening 3, but is merely of proper size so as to work in the opening. The shank 4 of the plunger is shown as provided with a tubular opening 6, the upper end of which is closed by a screw-plug 7, this being a matter of convenience in construction. The purpose is to provide an internal opening 6 within the shank of the plunger. One wall of the plunger is slotted, as at 8, throughout a portion of its length.

9 is a cylindrical guide rising from a bracket 10, secured to or made integral with a ring or collar 11. The guide 9 is shown as provided internally with an oil-chamber 12, which has branches or ducts 13, that distribute oil or other lubricant between the external surface of the guide 9 and the internal surface of the plunger.

The slot 8 permits the plunger to slide up and down on its guide 9 by accommodating the bracket 10 during such movements. The top wall of the slot by resting upon the top of the bracket 10 affords means for limiting downward motion or movement of the plunger. However, one or more washers may be inserted in the space 14, which is located between the top of the guide and the bottom of the plug 7, and these afford means for adjustably limiting the downward motion of the plunger. The ring or collar 11 is provided with a number of the described brackets, guides, and plungers corresponding with the number of the openings 3. Any material which escapes between the walls of the opening 3 and the top plate 2 falls through the spaces *a*, Fig. 1, and obviously may not reach the guiding-surfaces between the exterior of the guide 9 and the interior of the opening in the plunger. In fact, these latter surfaces are not only protected from such matter, but also from dust and dirt generally. The upright guide 9 serves to insure proper vertical movement of the plunger, and the side walls of the slot 8, coöperating with the bracket 10, serve to prevent undue rotary movement of the plunger in respect to the guide. The ring 11 may be secured, as by means of the set-screws 15, to the revoluble table 16, in which the openings 3 are formed. In this way the plungers 1 are properly supported in respect to their mold-openings 3 and may rotate with the table into line with the various parts of the machine with which they coöperate, such as the press 17, which is operated by means of a link 18, lever 19, and eccentric-rod 20, so that the press may shift the plunger upward into the molds in order to compress the bricks in respect to the back-stop or pressure-plate 21, and the eccentric-rod 20 may be operated from an eccentric on the shaft of the machine. For ejecting the pressed bricks the mold containing one of them is turned into such position that its plunger 1 is in line with the ejector 22, Fig. 6. The latter is raised by one end of a centrally-pivoted arm or follower 23, of which the other end engages the groove 24 of a driven cam 25. The fulcrum 26 of the follower has bolt-and-slot connections 27 with the frame 28 of the machine and is provided with screws 29, by means of which it can be raised and lowered and accurately positioned, the connections 27 serving to clamp it to place. By these means the fulcrum 26 can be raised and lowered and the upward throw of the ejector 22, and consequently the upward or ejecting throw of the plungers 1, adjusted. The adjustment of the fulcrum 26 effects the throw of the plungers 1 when used as ejectors and not when used to press the bricks. Of course it will be understood that the described plungers may be operated by other provisions of the machine which are well understood from the description of their operation in connection with the press.

It will be obvious to those skilled in the art to which the invention relates that modifications may be made in details without departing from the spirit thereof. Hence the invention is not limited further than the prior state of the art may require; but,

Having thus described the nature and objects of my invention, what I claim as new, and desire to secure by Letters Patent, is—

1. In a brick-making machine the combination of a table having an opening constituting a mold, a plunger having a top plate or part adapted to fit said opening and a reduced shank or body whereby space is afforded for the escape of material which passes the top part or plate, and a guide arranged internally of the plunger whereby it is protected from falling material, substantially as described.

2. The combination in a brick-making machine of a mold-table having an opening constituting a mold, a plunger having a top part or plate fitted to work in the opening and having a reduced body or shank, a guide arranged internally of the plunger, and a downward-limit stop for the plunger, substantially as described.

3. In combination a hollow laterally-slotted plunger having an enlarged top plate or part and a reduced shank, and a bracket provided with a guide accommodated by the hollow and slotted portions of the plunger, substantially as described.

4. In combination an internally-hollow and laterally-slotted plunger, a bracket accommodated by the slot in the plunger and adapted to collide with the top wall of the slot to constitute a limit-stop for the plunger, and a guide carried by the bracket and fitted to the internal space of the plunger and stopping short of the top thereof so as to afford a space for the reception of washers, substantially as described.

5. The combination in a brick-making machine of a mold-table having openings constituting molds, a collar clamped to said table, brackets carried by the collar and provided with guides, and internally-hollow and laterally-slotted plungers fitted to said guides and provided with top parts or plates corresponding with said openings and also provided with reduced shanks, substantially as described.

6. In combination a bracket provided with a guide fitted with an oil-chamber having communication with its exterior, and an internally-hollow and laterally-slotted plunger fitted over said guide and bracket, substantially as described.

7. In combination a bracket provided with an upright guide, and an internally-hollow slotted plunger fitted over said guide and bracket, substantially as described.

8. In a brick-making machine the combination of a table having an opening constituting a mold, a plunger adapted to work in said opening and constituting a bottom for the mold, an ejector arranged to lift the plunger, a cam, a follower engaging the cam and ejector, and an adjustable fulcrum for the follower whereby the upward ejecting throw of the plunger may be regulated, substantially as described.

9. In a brick-making machine the combination of a table having an opening constituting a mold, a plunger adapted to work in said opening and constituting a bottom for the mold, a centrally-pivoted lever for lifting the plunger to effect ejection, means for rocking the lever, and an adjustable fulcrum for the lever, substantially as described.

10. In a brick-making machine the combination of, a table having an opening constituting a mold, a plunger adapted to work in said opening and constituting a bottom for the mold, a centrally-pivoted lever for lifting the plunger to effect ejection, means for rocking the lever, a fulcrum for the lever, and slot-and-pin connections for the fulcrum, substantially as described.

11. In a brick-making machine the combination of, a table having an opening constituting a mold, a plunger adapted to work in said opening and constituting a bottom for the mold, a centrally-pivoted lever for lifting the plunger to effect ejection, means for rocking the lever, a fulcrum for the lever, slot-and-pin connections for the fulcrum, and an adjusting-screw for the fulcrum, substantially as described.

In testimony whereof I have hereunto signed my name.

HENRY G. MORRIS.

Witnesses:
W. J. JACKSON,
K. M. GILLIGAN.